(12) United States Patent
Myasnikov et al.

(10) Patent No.: US 6,860,923 B2
(45) Date of Patent: Mar. 1, 2005

(54) ONBOARD HYDROGEN STORAGE UNIT WITH HEAT TRANSFER SYSTEM FOR USE IN A HYDROGEN POWERED VEHICLE

(75) Inventors: Vitaliy Myasnikov, West Bloomfield, MI (US); Rosa Young, Bloomfield Hills, MI (US); Yang Li, Troy, MI (US); Stanford R. Ovshinsky, Bloomfield Hills, MI (US)

(73) Assignee: Texaco Ovonic Hydrogen Systems LLC, Rochester Hills, MI (US)

( * ) Notice: Subject to any disclaimer, the term of this patent is extended or adjusted under 35 U.S.C. 154(b) by 84 days.

(21) Appl. No.: 10/428,300

(22) Filed: May 2, 2003

(65) Prior Publication Data

US 2004/0031390 A1 Feb. 19, 2004

Related U.S. Application Data

(63) Continuation-in-part of application No. 10/218,941, filed on Aug. 14, 2002.

(51) Int. Cl.$^7$ .............................................. B01D 53/04
(52) U.S. Cl. .............................. 96/146; 96/153; 123/3; 206/0.7
(58) Field of Search ........................ 96/108, 113, 121, 96/126–128, 130, 134–136, 142, 146, 153, 154; 95/116, 127; 123/3; 206/0.7

(56) References Cited

U.S. PATENT DOCUMENTS

| | | | | |
|---|---|---|---|---|
| 2,450,289 A | * | 9/1948 | Marek | 422/120 |
| 3,108,445 A | * | 10/1963 | Portzer et al. | 62/46.3 |
| 4,311,232 A | * | 1/1982 | Klatt et al. | 206/0.7 |
| 4,446,111 A | * | 5/1984 | Halene et al. | 422/200 |
| 4,609,038 A | * | 9/1986 | Ishikawa et al. | 165/104.12 |
| 4,819,717 A | * | 4/1989 | Ishikawa et al. | 165/104.12 |
| 4,819,718 A | * | 4/1989 | Ishikawa et al. | 165/104.12 |
| 4,942,019 A | * | 7/1990 | Goodell et al. | 422/169 |
| 4,964,524 A | * | 10/1990 | Halene | 220/586 |
| 5,082,048 A | * | 1/1992 | Iwaki et al. | 165/104.12 |
| 5,092,281 A | * | 3/1992 | Iwaki et al. | 123/3 |
| 5,388,637 A | * | 2/1995 | Jones et al. | 165/104.12 |
| 5,460,745 A | * | 10/1995 | Lee | 252/182.32 |
| 6,267,229 B1 | * | 7/2001 | Heung | 206/0.7 |
| 6,299,670 B1 | * | 10/2001 | Applegarth | 95/114 |
| 6,616,738 B2 | * | 9/2003 | Iwamoto et al. | 96/146 |
| 6,626,323 B2 | * | 9/2003 | Stetson et al. | 220/577 |
| 6,634,321 B2 | * | 10/2003 | Hussain et al. | 123/3 |
| 6,733,571 B1 | * | 5/2004 | Arquin et al. | 95/90 |
| 2001/0027724 A1 | * | 10/2001 | Oshima et al. | 96/135 |
| 2001/0039803 A1 | * | 11/2001 | Stetson et al. | 62/46.2 |
| 2002/0020292 A1 | * | 2/2002 | Wojtowicz et al. | 95/116 |
| 2002/0100369 A1 | * | 8/2002 | Kuriiwa et al. | 96/146 |
| 2002/0117123 A1 | * | 8/2002 | Hussain et al. | 123/3 |
| 2003/0019765 A1 | * | 1/2003 | Yang et al. | 206/0.7 |
| 2003/0167923 A1 | * | 9/2003 | Grote et al. | 96/108 |
| 2003/0209147 A1 | * | 11/2003 | Myasnikov et al. | 96/146 |
| 2003/0209148 A1 | * | 11/2003 | Myasnikov et al. | 96/146 |
| 2003/0209149 A1 | * | 11/2003 | Myasnikov et al. | 96/146 |

FOREIGN PATENT DOCUMENTS

| | | | |
|---|---|---|---|
| EP | 0422559 A1 | * | 4/1991 |
| GB | 2234451 A | * | 2/1991 |

* cited by examiner

*Primary Examiner*—Robert H. Spitzer
(74) *Attorney, Agent, or Firm*—Frederick W. Mau, II; Marvin S. Siskind

(57) ABSTRACT

An onboard hydrogen storage unit with heat transfer system for a hydrogen powered vehicle. The system includes a hydrogen storage vessel containing a hydrogen storage alloy configured to receive a stream of hydrogen and provide hydrogen for use in powering a vehicle. During refueling a cooling/heating loop is used to remove the heat of hydride formation from the hydrogen storage alloy and during operation of the vehicle the heating/cooling loop is used to supply heat to the hydrogen storage alloy to aid in hydrogen desorption.

20 Claims, 6 Drawing Sheets

ONBOARD HYDROGEN STORAGE UNIT WITH HEAT TRANSFER SYSTEM FOR USE IN A HYDROGEN POWERED VEHICLE

CROSS REFERENCE TO RELATED APPLICATIONS

The present invention is a continuation-in-part of, and is entitled to the benefit of the earlier filing date and priority of, co-pending U.S. patent application Ser. No. 10/218,941, entitled "Onboard Hydrogen Storage Unit With Heat Transfer System For Use In A Hydrogen Powered Vehicle", filed Aug. 14, 2002, which is assigned to the same assignee as the current application, the disclosure of which is hereby incorporated by reference.

FIELD OF THE INVENTION

The present invention generally relates to cooling and heating systems for hydrogen storage units. More particularly, the present invention relates to a heat transfer system used to cool a hydrogen storage vessel utilizing a hydrogen storage alloy upon charging at a hydrogen fueling station and a heating system used to heat the hydrogen storage vessel to aid in release of hydrogen during cold startup and operating conditions.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations.

For nearly a century and a half, fuels with high amounts of carbon have progressively been replaced by those containing smaller and smaller amounts of carbon. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The hydrogen can also be readily generated and stored. For example, economical, lightweight, triple-junction amorphous silicon solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds. The hydrogen storage capacity of the hydrogen storage alloys allow hydrogen to be stored in solid form for transport by barge, tanker, train or truck in safe, economical form for ultimate use. Energy is the basic necessity of life and civilization for any society today and the use of hydrogen in the manner described herein as the basic source of energy would end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations.

While hydrogen has wide potential application as a fuel, a major drawback in its utilization, especially in mobile uses such as the powering of vehicles, has been the lack of acceptable lightweight compact hydrogen storage medium. Conventionally, hydrogen has been stored in pressure-resistant vessels under a high pressure or stored as a cryogenic liquid, being cooled to an extremely low temperature. Storage of hydrogen as a compressed gas or liquid involves the use of large and/or cryogenic vessels, making the use of hydrogen to power vehicles less feasible.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid form. Also, hydrogen storage in a solid hydride presents fewer safety problems than those caused by hydrogen stored in containers as a gas or a liquid. These alloys are fully described in U.S. Pat. No. 6,193,919, entitled "High Storage Capacity Alloys Enabling a Hydrogen-based Ecosystem", which is hereby incorporated by reference.

With these developments in the storage of hydrogen, hydrogen now has a viable use as a fuel to power vehicles. Solid-phase metal or alloy system can store large amounts of hydrogen by absorbing hydrogen with a high density and by forming a metal hydride under a specific temperature/pressure or electrochemical conditions, and hydrogen can be readily released by applying heat.

With hydrogen now being a viable source to power vehicles, considerable research has been performed on designing internal combustion engines to run on hydrogen rather than fossil fuels. In these designs, a hydrogen/air mixture is combusted inside an internal combustion engine much like gasoline and other hydrocarbon fuels are combusted in present day internal combustion engines. With hydrogen, however, catalytic converters are not needed to treat the exhaust to comply with emission standards. Hydrogen burns clean with the only byproduct being water.

Considerable research has also been performed on using fuel cells to power vehicles. Fuel cells, like batteries, operate by utilizing electrochemical reactions. Unlike a battery, in which chemical energy is stored within the cell, fuel cells generally are supplied with reactants from outside the cell to produce an electrical current used to power a vehicle. In fuel cells, a hydrogen stream, an oxygen stream, and an electrolyte stream are used to provide an electric current. Fuel cells offer a number of important advantages over internal combustion engine or generator systems. These include relatively high efficiency, environmentally clean operation, high reliability, few moving parts, and quiet operation. Fuel cells potentially are more efficient than other conventional power sources based upon the Carnot cycle.

For hydrogen to become a viable alternative to hydrocarbon fuels, various systems are needed for the storage and maintenance of hydrogen in vehicles. These systems must allow for simple and efficient refueling to gain acceptance by the general public. The stored hydrogen must also be available from the hydrogen storage system on demand to power a vehicle regardless of the outside temperature during startup or operation.

The present invention describes an innovative design for a heat transfer system used to cool a vehicle's hydrogen storage bed during charging and heat the hydrogen storage bed during operation of the vehicle and startup. The heat transfer system removes heat of hydride formation from the vehicles hydrogen storage vessel to minimize the time needed for refueling the vehicle and supplies heat to the hydrogen storage vessel to aid in the release of hydrogen from the hydrided hydrogen storage alloy during operation of the vehicle and startup.

SUMMARY OF THE INVENTION

The present invention discloses an onboard hydrogen storage unit with heat transfer system for a hydrogen powered vehicle including a hydrogen storage vessel at least partially filled with a hydrogen storage alloy, a primary loop adapted to transfer heat to and from the hydrogen storage alloy stored in the hydrogen storage vessel, and a secondary loop thermally coupled to said primary loop.

The hydrogen storage vessel is adapted to receive a stream of hydrogen from an outside hydrogen source, such as a fueling station. During refueling, the hydrogen storage alloy produces heat from hydride formation. A primary loop is used to remove the heat from the hydrogen storage alloy to optimize time needed for refueling.

During refueling, the primary loop is an open loop. The primary loop receives a stream of cooling fluid from an outside source, such as the refueling station. The primary loop includes one or more tubes in thermal contact with said hydrogen storage alloy. The cooling fluid thereby circulates through the primary loop and removes any heat produced by the absorption of hydrogen into the hydrogen storage alloy.

During operation of the vehicle the primary loop is a closed loop used to provide heat to the hydrogen storage alloy to aid in release of hydrogen from the hydrogen storage alloy. The primary loop contains a fluid sealed in the loop remaining from the refueling process. The fluid in the primary loop is heated and circulated through the primary loop thereby providing heat to the hydrogen storage alloy. The fluid in the primary loop is heated using a heat exchanger. Heat may be provided to the heat exchanger from a heated fluid circulated in a secondary loop or by a catalytic combustor. The secondary loop is used as a source of heat during operation of the vehicle and the catalytic combustor is used as a source of heat during cold startup of the vehicle. Unabsorbed and absorbed hydrogen present in the hydrogen storage tank may be used to fuel the catalytic combustor.

During operation of the vehicle, the fluid within the primary loop is circulated through the primary loop using a pumping device. The pumping device may be an electrical or directional coupled turbine mechanically coupled to a secondary loop circulating a heating fluid. The directionally coupled turbine circulates the fluid through the primary loop using the flow of the heating fluid circulating through the secondary loop.

DETAILED DESCRIPTION OF THE INVENTION

The present invention discloses an onboard hydrogen storage unit with heat transfer system for use in a hydrogen powered vehicle. The heat transfer system is designed to be used in conjunction with at least one hydrogen storage vessel at least partially filled with a hydrogen storage alloy. The hydrogen storage vessels are configured to receive hydrogen from a refueling station and supply the hydrogen as needed for fuel. The hydrogen may be used as fuel for a fuel cell, a hydrogen powered internal combustion engine, or other means for propelling a vehicle using hydrogen as a fuel.

During refueling, the hydrogen storage alloy contained inside the hydrogen storage vessel absorbs hydrogen, thereby producing a considerable amount of heat (heat of hydride formation). If the heat remains present, the rate of absorption of hydrogen into the hydrogen storage alloy is decreased and the time for refueling the vessel is increased. The heat created by the absorption of the hydrogen into the hydrogen storage alloy must be removed fast enough to maximize the absorption rate of hydrogen into the hydrogen storage alloy thereby minimizing the time needed for refueling. The present invention discloses a novel approach for removing the heat of hydride formation from the hydrogen storage vessel during refueling to minimize refueling time.

In addition to cooling the hydrogen storage alloy, the present invention is also designed to supply heat to the hydrogen storage alloy during startup or operation of the vehicle. Adding heat to the hydrogen storage alloy aids in releasing the hydrogen from the hydrogen storage alloy, resulting in a readily available stream of hydrogen being supplied from the hydrogen storage vessel.

Figure 1:
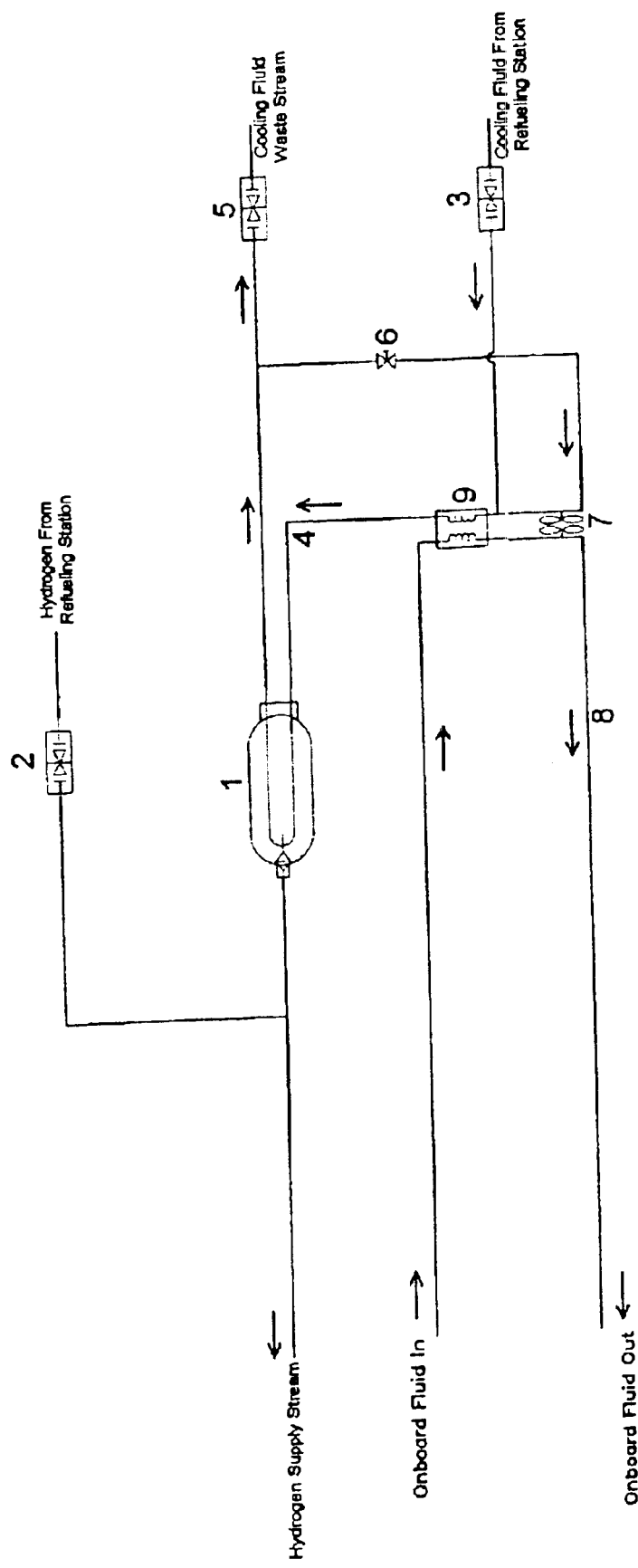
FIG. 1, shows a diagram of the preferred embodiment of the present invention.

The preferred embodiment of the present invention is shown in FIG. 1. The present invention comprises a primary loop, a secondary loop, one or more hydrogen storage vessels, one or more heat exchangers, multiple valves, and multiple fast coupling connectors.

During refueling, hydrogen is supplied from an offboard source to a hydrogen storage vessel 1 containing a hydrogen storage alloy. The hydrogen source is sealably connected to a hydrogen inlet 2. The hydrogen inlet 2 may be a fast coupling connector providing an air tight seal with the hydrogen source. The hydrogen flows through the hydrogen inlet 2 and through a conduit to the hydrogen storage vessel 1 containing the hydrogen storage alloy. The hydrogen is absorbed by the hydrogen storage alloy and heat is produced. To maintain optimal absorption of the hydrogen into the hydrogen storage alloy, the heat of hydride formation must be removed from the hydrogen storage alloy. This is accomplished by circulating a cooling fluid through the hydrogen storage vessel 1 during refueling.

A low temperature cooling fluid is supplied to the system from an offboard source prior to and during refueling. The low temperature cooling fluid may be water, ethylene glycol, mixtures thereof or other fluids suitable for heat transfer within the system. By using an offboard source of a low temperature heat transfer fluid, less space is needed for implementation of the heat transfer system to accommodate fast filling. The source of the low temperature heat transfer fluid is sealably connected to the primary loop inlet 3. The primary loop inlet 3 may be a fast coupling connector providing an air tight seal with the cooling fluid source. The low temperature cooling fluid is pumped from the offboard source into the primary loop 4. The heat transfer fluid flows through the primary loop 4 to the hydrogen storage vessel 1. The cooling fluid flows through one or more tubes or flow channels contained inside the hydrogen storage vessel 1 in thermal contact with the hydrogen storage alloy. The low temperature cooling fluid absorbs the heat formed from the hydride formation, exits the hydrogen storage vessel, and exits the system through the primary loop outlet 5. A valve 6 is located in the primary loop which is closed prior to receiving the low temperature cooling fluid. The valve 6 is closed to form an open loop allowing the fluid to continuously flow through the primary loop 4. After refueling, the valve 6 is opened and the primary loop inlet 3 and the primary loop outlet 5 are sealed. After refueling, the primary loop 4 remains filled with the cooling fluid. During startup and operation of the vehicle, this cooling fluid is heated and used for transferring heat to the hydrogen storage alloy to aid in the release of hydrogen from the hydrogen storage alloy.

During operation of the vehicle, heat is supplied to the hydrogen storage alloy from the primary loop 4. The cooling fluid remaining in the primary loop 4 is heated and circulated through the primary loop 4 using a directionally coupled turbine 7 mechanically coupled to a secondary loop 8. The secondary loop may be a cooling loop for the fuel cell of internal combustion engine of the vehicle. Heating fluid in the secondary loop 8 is continuously circulated through the secondary loop 8 during operation. The directionally coupled turbine 7 circulates the fluid remaining in the primary loop through the primary loop 4 using the flow of fluid through the secondary loop 8 thereby eliminating the need for a pump in the primary loop.

Figure 2:
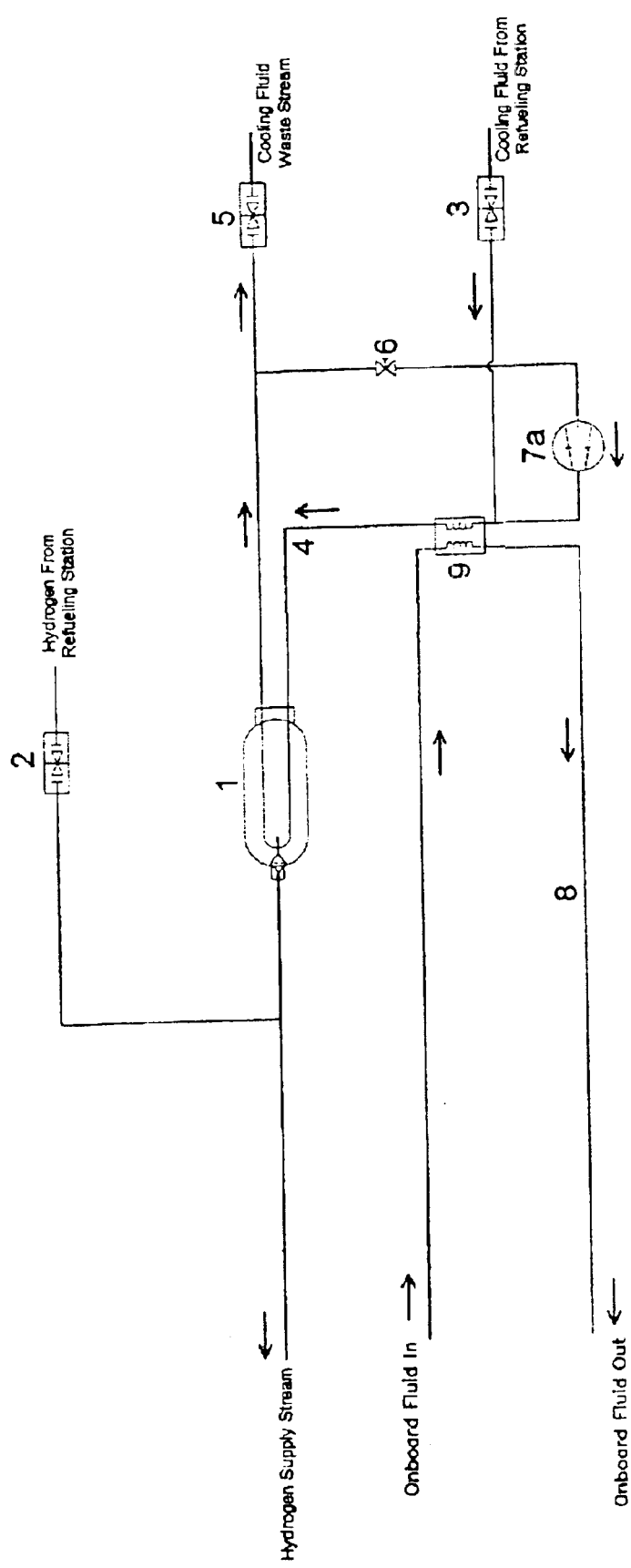
FIG. 2, shows a diagram of an alternative embodiment of the present invention.

Heat is provided to the cooling fluid contained in the primary loop 4 from a heating fluid circulating in the secondary loop 8. The primary loop 4 may be in thermal contact with a secondary loop 8 via a heat exchanger 9. The secondary loop 8 provides heat to the fluid in the primary loop 4 during operation of the vehicle. The fluid flowing through the secondary loop 8 may be the cooling loop for the vehicle that receives heat from a fuel cell or hydrogen internal combustion engine, depending on the application, or another source of heat. While circulating through the primary loop 4, the heated fluid flows through tubes in the hydrogen storage vessel 1 in the same manner as during refueling. The heated fluid provides heat to the hydrided hydrogen storage alloy to aid in the release of hydrogen. In an alternative embodiment of the present invention, the directionally coupled turbine 7 is replaced with a pump 7a. This embodiment is shown in FIG. 2.

Figure 3:
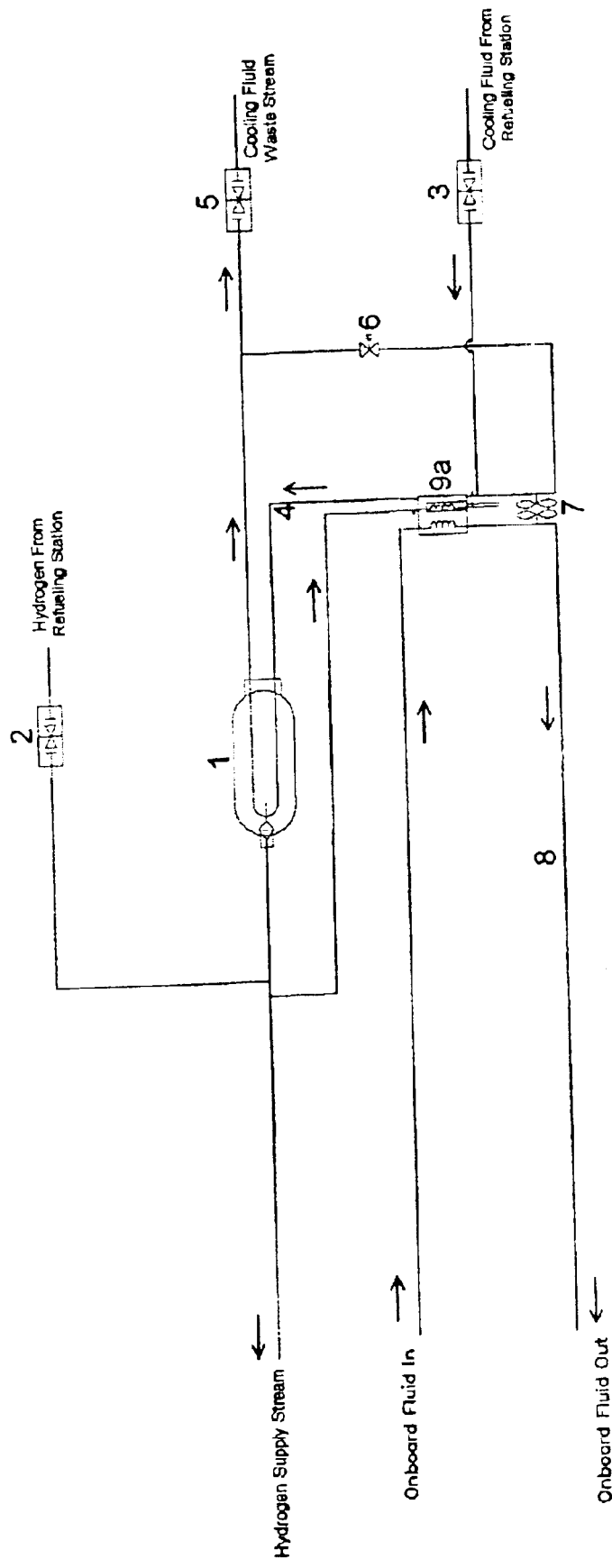
FIG. 3, shows a diagram of the preferred embodiment of the present invention where a catalytic combustor is used during cold startup.
Figure 4:
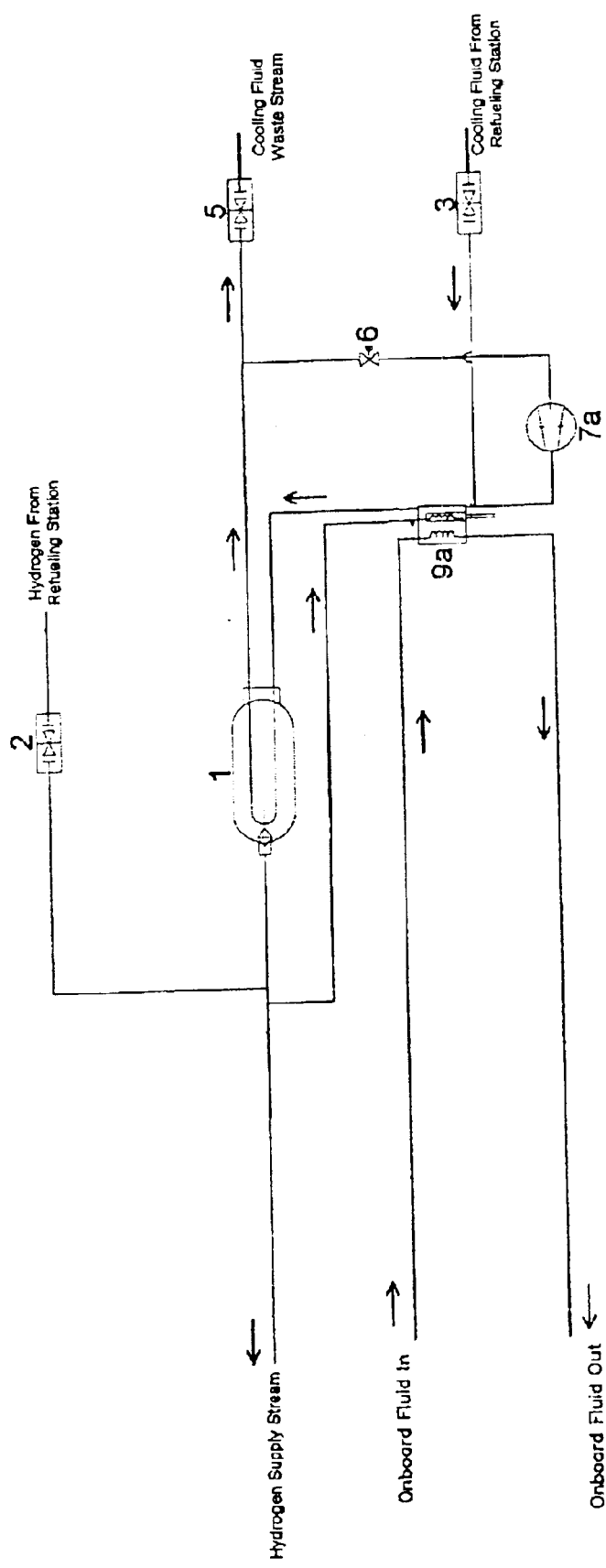
FIG. 4, shows a diagram of an alternative embodiment of the present invention where a catalytic combustor is used during cold startup.

During cold startup, heat may not be readily supplied from the secondary loop to the primary loop. A catalytic combustor 9a may be used to quickly heat the cooling fluid contained in the primary loop 4. The catalytic combustor may be thermally connected to either the heat exchanger or the primary loop 4. This embodiment exemplified in FIG. 3 shows the catalytic combustor thermally connected to the heat exchanger. In this embodiment, a small amount of hydrogen is supplied from the hydrogen storage vessel 1 to the catalytic combustor 9a. Although the temperature within the hydride bed may be such that a high rate of hydrogen is not readily released from the hydrogen storage material, a minimal amount of hydrogen may still be provided to the catalytic combustor 9a from the hydrogen storage vessel. This minimal amount of hydrogen contained in the hydrogen storage vessel is all that is needed by the catalytic combustor 9a to heat the fluid in the primary loop to begin releasing hydrogen from the hydrogen storage alloy. In an alternative embodiment of the present invention utilizing a catalytic combustor, the directionally coupled turbine 7 is replaced with a pump 7a. This embodiment is shown in FIG. 4.

Figure 5:
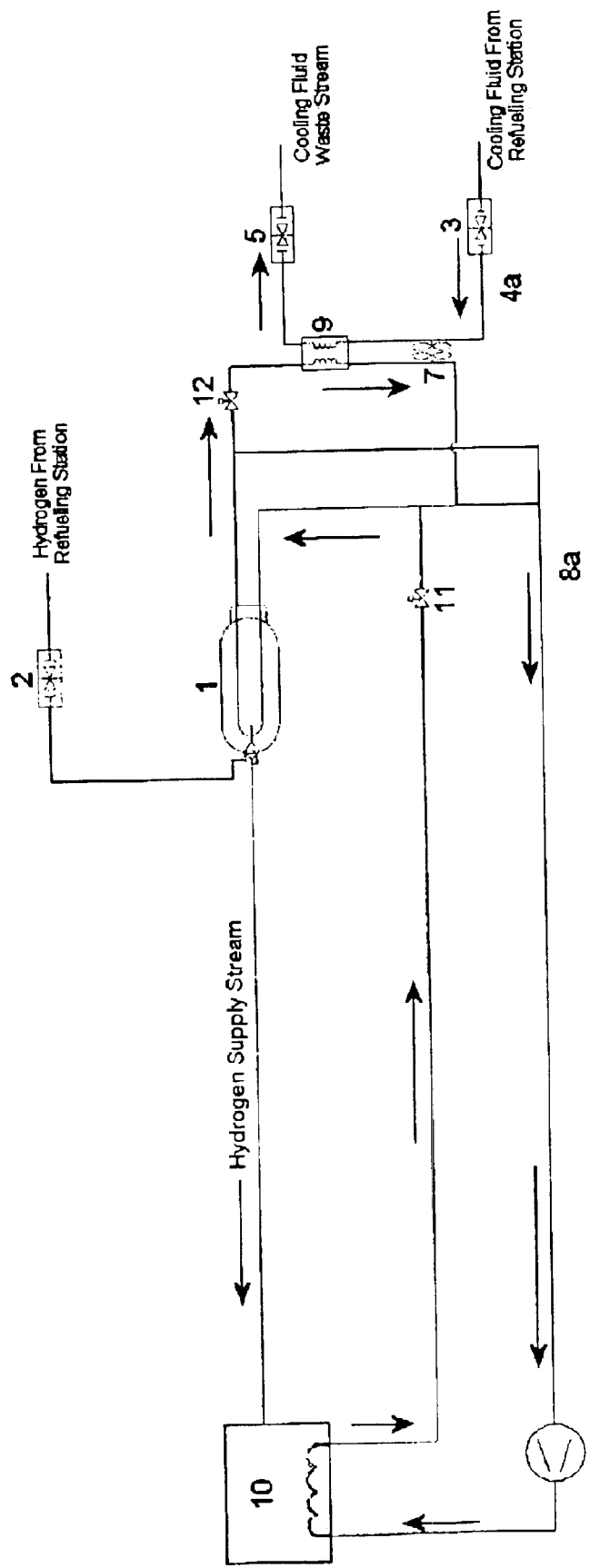
FIG. 5, shows a diagram of an alternative embodiment of the present invention where the primary loop is used only to cool the secondary loop during refueling.

In an alternative embodiment, the primary loop 4a of the present invention may be used only to cool the secondary loop during refueling. This embodiment is depicted in FIG. 5. During operation of the vehicle, the secondary loop 8a serves dual purposes. The secondary loop 8a acts as a cooling loop for the vehicle by receiving heat from a fuel cell or hydrogen internal combustion engine 10, depending on the application, or another source of heat and provides the heat to the hydrogen storage vessel 1 to aid in the release of hydrogen from the hydrogen storage alloy. During operation of the vehicle, a valve 12 remains closed and valve 11 remains open. During refueling, the secondary loop 8a is shortened by closing valve 11 and opening valve 12. The secondary loop is then used to remove heat of hydride formation from the hydrogen storage vessel 1. Cooling fluid received from an offboard source, during refueling, is used to cool the fluid circulating in the secondary loop via a heat exchanger 9. A directional coupled turbine 7 is used to circulate the fluid in the primary loop through the hydrogen storage vessel using the flow of the cooling fluid from the offboard source, thereby eliminating the need for use of a pump during refueling.

Figure 6:
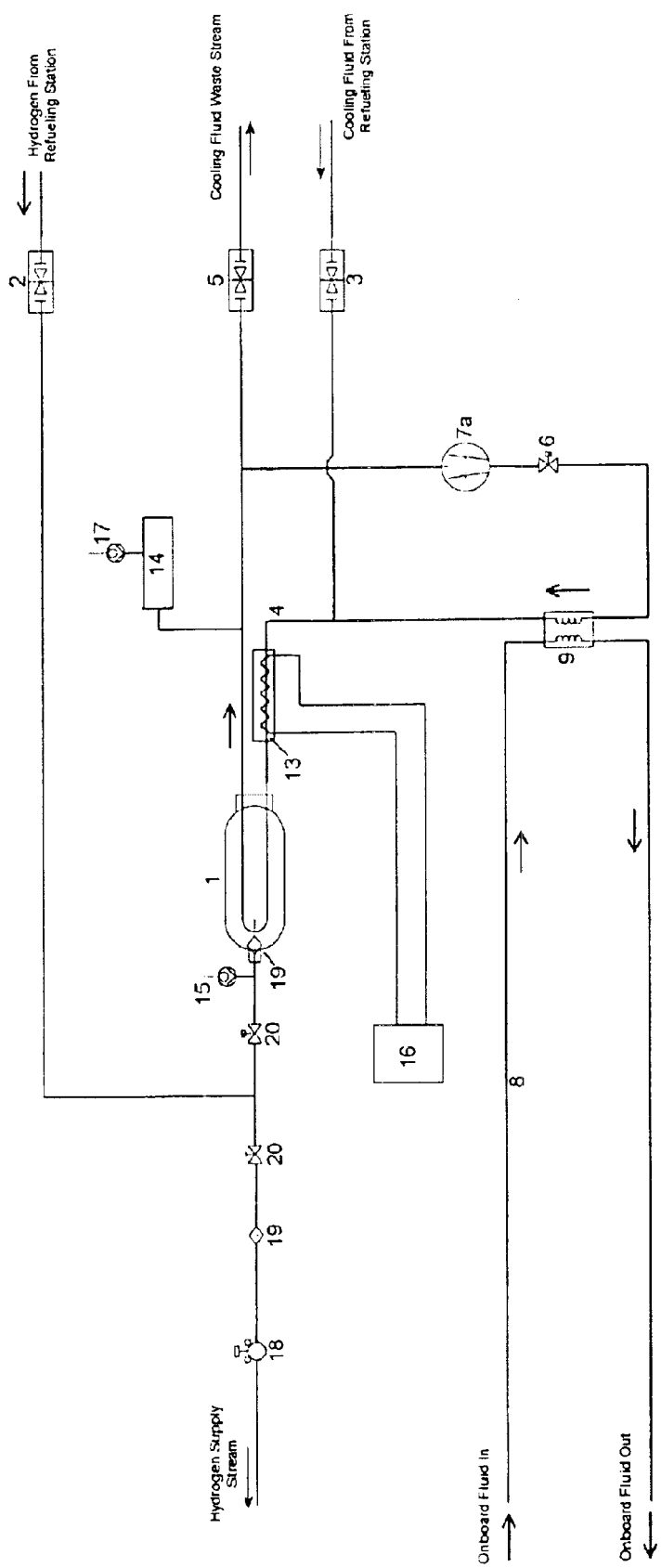
FIG. 6, shows a diagram of an alternative embodiment of the present invention wherein the primary loop is heated using an electrical heater.

In another embodiment of the present invention, as shown in FIG. 6, the present invention may further include an electrical heater 13 in thermal communication with the primary loop 4, an expansion tank 14 in fluid communication with the primary loop, and a pressure relief valve 15 adapted to vent the hydrogen stream being fed to or fed from the hydrogen storage vessel 1 in case of a pressure buildup. The electrical heater 13 may be supplied with power from an internal or external source of power 16. The source of power 16 may be a vehicle battery or power generator within the vehicle or a plug receiving an electrical current from an electrical outlet while the vehicle is parked. An internal source of power may be used to aid in desorption of hydrogen from the hydrogen storage tank during operation of the vehicle, and the external source of power may be used to aid in desorption of hydrogen from the hydrogen storage tank prior to and during vehicle startup. The expansion tank 14 is adapted to allow for expansion of heated fluid within the primary loop 4 to prevent damage to the primary loop. The expansion tank 14 may also have a pressure relief valve 17 to remove excess pressure from the primary loop 4. A pressure regulator 18 may also be included to regulate the pressure of the exiting hydrogen stream as needed. Filters 19 may also be used to remove any particulate from the hydrogen stream to prevent blockage within the system. The valve 6 in the primary loop works in the same manner as described in regard to FIG. 1. Additional valves 20 may also be utilized to further control hydrogen flowing to or from the hydrogen storage vessel as needed.

The hydrogen storage vessels 1 may be pressure containment vessels at least partially filled with a hydrogen storage alloy. The hydrogen storage vessels may have a series of tubing running throughout the interior of the vessels. The tubing may be adapted to receive a heat transfer fluid and use such fluid to heat or cool the contents of the vessel. The interior of such vessels may also be divided into compartments by thermally conductive materials to better accommodate heat transfer throughout the vessel and prevent densification and subsequent expansion of the hydrogen storage alloy (upon charging with hydrogen) which can cause strain to the wall of the vessel. Such hydrogen storage vessels are described in U.S. patent application Ser. No. 10/143,243, entitled "A Honeycomb Hydrogen Storage Structure", filed on May 9, 2002 the disclosure of which is herein incorporated by reference.

The alloys used within the metal hydride hydrogen storage unit may be any of those known in art for such purposes. Specific alloys include $AB_2$, $AB_5$, or BCC phase alloys, such as rare earth-nickel alloys, titanium-manganese alloys, titanium-zirconium alloys, titanium-iron alloys, magnesium alloys, and the like. Examples of such alloys can be found in U.S. Pat. Nos. 6,193,929; 6,103,024; 5,976,276; 5,916,381; 5,840,440; 4,832,913; 4,431,561 and in U.S. patent application Ser. Nos. 09/573,240; 09/609,487; 09/902,320; 09/901,816; 09/444,812; 09/873,863, all of which are herein incorporated by reference.

An example of a useful hydrogen storage alloy is a low temperature hydrogen storage alloy which is non-pyrophoric upon exposure to ambient atmosphere. The alloy particularly is non-pyrophoric even after hydrogen charge/discharge cycling. The alloy is an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the alloy included adjusting the composition of the alloy to include increased chromium levels beyond that of conventional $TiMn_2$ alloys. That is, as the chromium content of the alloy increases, the tendency to be pyrophoric decreases. Particularly preferred alloy compositions comprise 0.5–10 at. % Zr, 29–35 at. % Ti, 10–15 at. % V, 13–20 at. % Cr, 32–38 at. % Mn, 1.5–3.0 at. % Fe, and 0.05–0.5 at. % Al. The alloy may further contain 1–10 at. % total of at least one element selected from the group consisting of Ba, Co, Cu, Cs, K, Li, Mm, Mo, Na, Nb, Ni, Rb, Ta, Tl, and W. Specific examples of useful alloys include the compositions $Zr_1 Ti_{33} V_{12.54} Cr_{15} Mn_{36} Fe_{2.25} Al_{0.21}$ and $Zr_{1.5} Ti_{32.5} V_{12.54} Cr_{15} Mn_{36} Fe_{2.25} Al_{0.21}$.

The foregoing is provided for purposes of explaining and disclosing preferred embodiments of the present invention. Modifications and adaptations to the described embodiments, particularly involving changes to the primary or secondary loops, the operating conditions of the heat transfer system, and positioning of the system components will be apparent to those skilled in the art. These changes and others may be made without departing from the scope or spirit of the invention in the following claims.

What is claimed is:

1. A hydrogen storage unit for a hydrogen powered vehicle comprising:
   a hydrogen storage vessel at least partially filled with a hydrogen storage alloy;
   a primary loop adapted to transfer heat to and from said hydrogen storage alloy in said hydrogen storage vessel;
   a secondary loop thermally coupled to said primary loop; and
   an electrical heater in thermal communication with said primary loop adapted to receive an electrical current from a source of power internal or external to said vehicle.

2. The apparatus according to claim 1, wherein said hydrogen storage vessel is adapted to receive a stream of hydrogen from an outside hydrogen source.

3. The apparatus according to claim 1, wherein said primary loop comprises one or more tubes in thermal contact with said hydrogen storage alloy.

4. The apparatus according to claim 3, wherein said primary loop is an open loop.

5. The apparatus according to claim 4, wherein said primary loop is adapted to receive a stream of cooling fluid from an outside source.

6. The apparatus according to claim 5, wherein said stream of cooling fluid circulates through said primary loop.

7. The apparatus according to claim 6, wherein said stream of cooling fluid circulating through said primary loop removes heat produced by said hydrogen storage alloy upon absorption of hydrogen.

8. The apparatus according to claim 3, wherein said primary loop is a closed loop.

9. The apparatus according to claim 8, wherein said primary loop contains a heat transfer fluid.

10. The apparatus according to claim 9, wherein a heating fluid is circulated throughout said secondary loop.

11. The apparatus according to claim 10, wherein said heat transfer fluid contained within said primary loop is circulated through said primary loop using a pumping device.

12. The apparatus according to claim 11, wherein said pumping device is a directional coupled turbine mechanically coupled to said secondary loop.

13. The apparatus according to claim 12, wherein said directionally coupled turbine circulates said heat transfer fluid through said primary loop using the flow of said heating fluid circulating through said secondary loop.

14. The apparatus according to claim 11, wherein said heat transfer fluid circulating through said primary loop is heated using a heat exchanger.

15. The apparatus according to claim 14, wherein said heat transfer fluid circulating through said primary loop provides heat to said hydrogen storage alloy.

16. The apparatus according to claim 14, wherein said heat exchanger provides heat to said heat transfer fluid circulating through said primary loop from said heating fluid circulating through said secondary loop.

17. The apparatus according to claim 16, wherein said heating fluid circulating through said secondary loop provides heat to said heat transfer fluid circulating through said primary loop via said heat exchanger after a cold startup.

18. The apparatus according to claim 14, wherein a catalytic combustor thermally connected to said primary loop provides heat to said heat transfer fluid circulating through said primary loop.

19. The apparatus according to claim 18, wherein said catalytic combustor is initially fueled with an amount of unabsorbed hydrogen contained within said hydrogen storage vessel.

20. The apparatus according to claim 19, wherein said catalytic combustor provides heat to said heat transfer fluid circulating through said primary loop via said heat exchanger during a cold startup.

* * * * *